June 17, 1924.   J. A. ANGLADA   1,498,338
MOTOR VEHICLE
Filed March 16, 1922   3 Sheets-Sheet 3
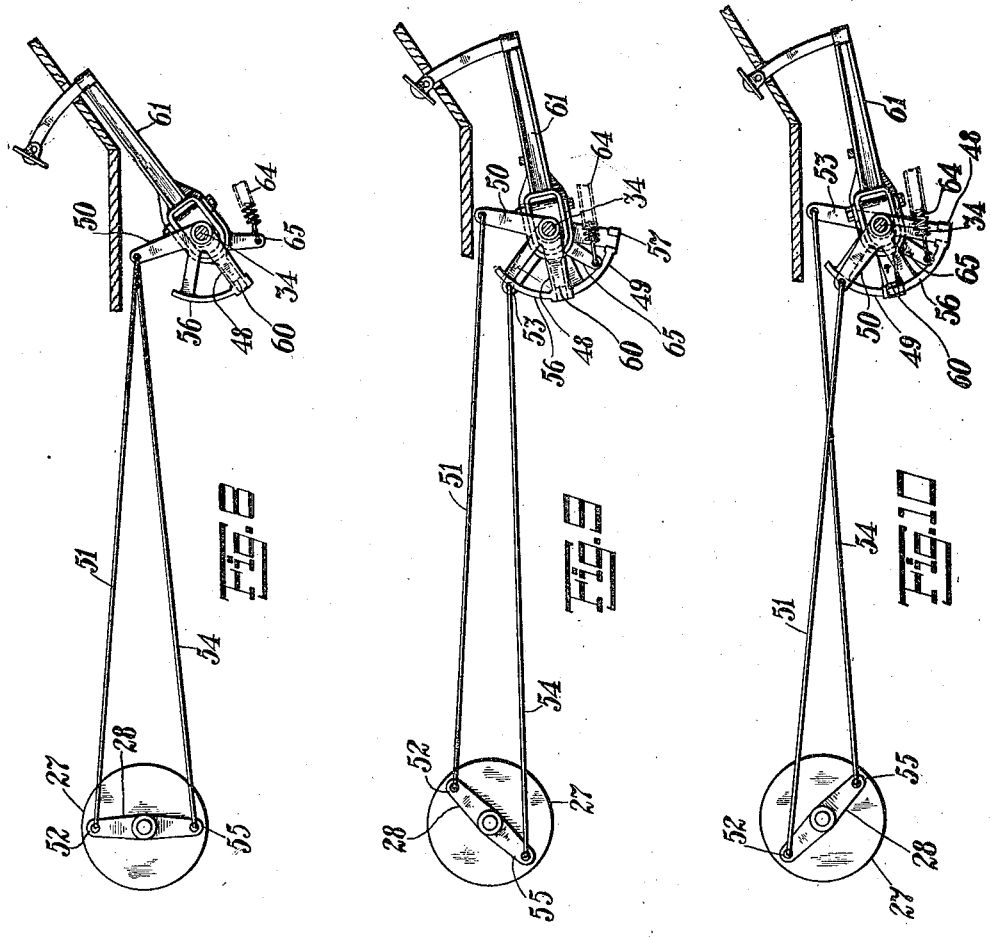
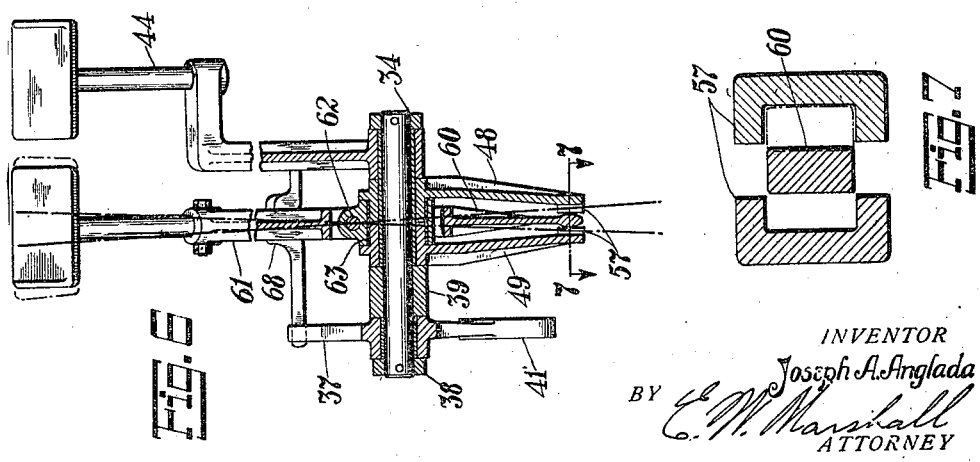
INVENTOR
*Joseph A. Anglada*
BY *E. W. Marshall*
ATTORNEY Patented June 17, 1924.

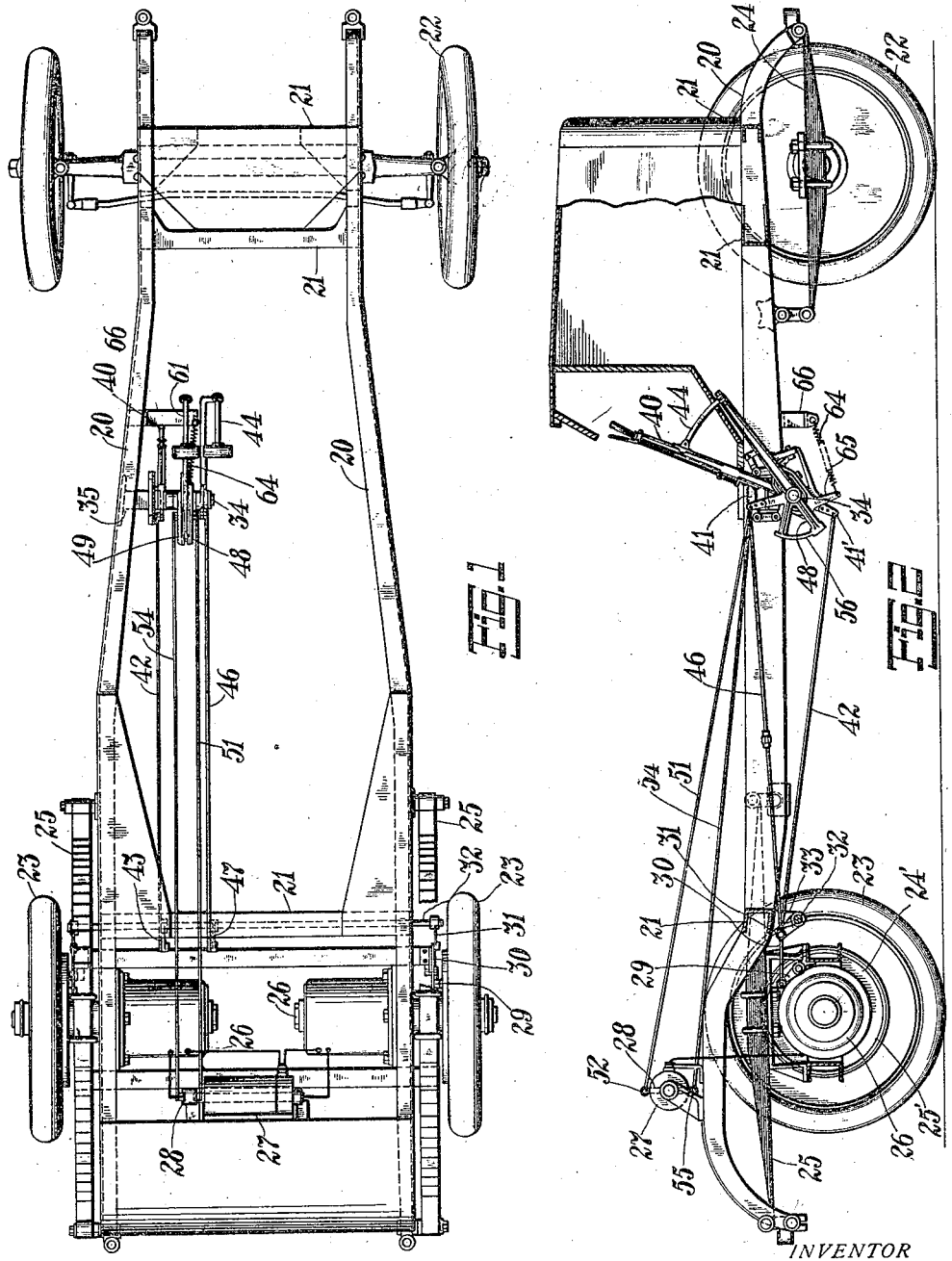

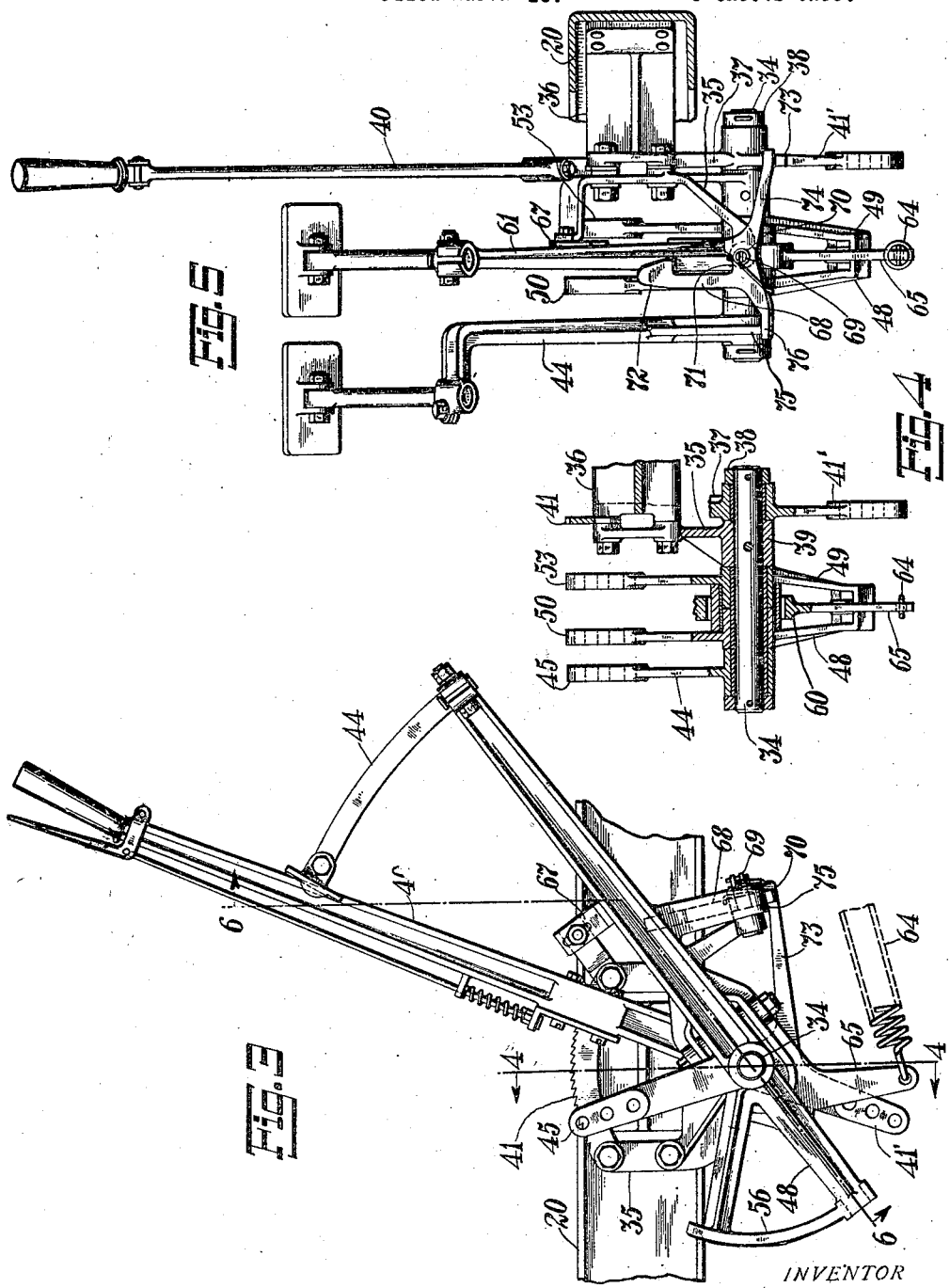

1,498,338

UNITED STATES PATENT OFFICE.

JOSEPH A. ANGLADA, OF JENKINTOWN, PENNSYLVANIA.

MOTOR VEHICLE.

Application filed March 16, 1922. Serial No. 544,344.

*To all whom it may concern:*

Be it known that I, JOSEPH A. ANGLADA, a citizen of the United States of America, and a resident of Jenkintown, county of Montgomery, and State of Pennsylvania, United States of America, have invented certain new and useful Improvements in Motor Vehicles, of which the following is a specification.

This invention relates to controlling mechanism for motor vehicles and more particularly to means for controlling the forward and reverse speeds and for controlling the brake mechanism.

In the operation of a motor vehicle it is desirable for economic and efficient operation that the power be disconnected from the drive wheels before the brakes are applied.

This invention has for its object to provide control mechanism for motor vehicles so constructed and arranged that the power will be disconnected from the drive wheels before the application of the brakes.

Another object of the invention is to provide means for interconnecting the speed controlling or power controlling mechanism and the brake actuating mechanism in such a manner that the operation of the brake actuating mechanism will automatically release the power control mechanism permitting its return to its normal inactive position of adjustment.

Another object of the invention is to provide simple, practical and efficient means for controlling the forward and reverse speeds of an electrically operated motor vehicle.

Further objects of the invention will appear from the following specification taken in connection with the drawings which form a part of this specification and in which, Fig. 1 is a top plan view of a chassis of a motor vehicle having control mechanism constructed in accordance with the invention.

Fig. 2 is a longitudinal sectional view of the construction shown in Fig. 1.

Fig. 3 is an enlarged detail view showing in elevation the control lever mechanism.

Fig. 4 is a sectional elevation taken substantially on line 4—4 of Fig. 3.

Fig. 5 is an elevational view taken at right angles to Fig. 3.

Fig. 6 is a sectional detail view taken substantially on line 6—6 of Fig. 3.

Fig. 7 is a sectional elevation on an enlarged scale taken substantially on line 7—7 of Fig. 6.

Fig. 8 is an elevation, partly in section, showing the control lever and connecting arms and controller arm in neutral position.

Fig. 9 is an elevational view similar to Fig. 8 but showing the parts in their position of adjustment for high speed drive in the forward direction and Fig. 10 is an elevational view showing the parts in the position of adjustment for high speed reverse drive.

The invention may be briefly described as comprising a motor vehicle having one or more driving motors connected to drive the wheels and control mechanism for the motors consisting of a control lever operable to engage one or the other of a pair of arms connected to the motor controlling means.

In the particular embodiment of the invention shown, the vehicle is driven by electric motors and an electric controller is provided with a pivoted control arm connected to a pair of control arms at the front of the vehicle adapted to be actuated by a control lever selectively engageable with either of said arms. Brake mechanism is mounted on the vehicle and is controlled by brake levers and means is provided for so interconnecting the brake levers and the control lever that the power will be automatically disconnected from the driving wheels when the brakes are applied thereto.

The motor vehicle comprises side frame members 20 and cross frame members 21, the frame being mounted upon front wheels 22 and rear wheels 23. Springs 24 and 25 are interposed between the frame and the axles of the wheels.

In the particular embodiment of the invention shown electric motors 26 are mounted on the axles of the rear wheels and furnish the power for driving the wheels.

A motor controller 27 of a suitable construction is supported at the rear end of the vehicle frame and the control arm 28 is pivotally mounted at one end of the controller and is connected by suitable connections hereinafter described to the control mechanism at the front of the vehicle.

Brake mechanism is provided for each of the rear wheels 23 and comprises a drum 24' and a brake band 25'. The brake band in each instance is actuated by an arm 29 connected by a link 30 to an arm 31 carried by a shaft 32. The shaft 32 extends across the frame and is mounted in a bracket 33 at each side of the frame.

The control mechanism and brake actuating levers are mounted on a shaft 34 carried by a bracket 35 secured in turn to a bracket 36 which is bolted to one of the side frame members 20. The hand brake lever 37 is rotatably mounted at one end of the shaft 34 and between a collar 38 carried by the shaft and a sleeve 39 formed on the bracket 35. The hand brake lever extends upwardly as shown at 40, the portion 40 being provided with the usual spring pressed pawl which is adapted to engage a toothed sector 41 formed on or secured to the bracket 36. The hand brake lever also extends below the pivot shaft 34 as shown at 41' and the arm 41' is connected by a link or rod 42 to an arm 43 secured to the shaft 32.

The foot brake lever or pedal 44 is mounted at the opposite end of the shaft 34 and has an arm 45 secured to or formed integral therewith and connected by a link or rod 46 to an arm 47 secured to the shaft 32. It will be understood without further explanation that the brake mechanism may be actuated by either the foot brake pedal or the hand brake lever.

The motor control mechanism whereby the speed of the vehicle and the direction of travel may be controlled will now be described. This control mechanism comprises a pair of selectively operable members 48 and 49 journaled on the shaft 34 and positioned side by side. The member 48 has an upwardly extending arm 50 connected by a link 51 to one end 52 of the control arm 28 and the other member 49 has an upwardly extending arm 53 connected by a link 54 to the arm 28 as shown at 55 on the opposite side of the pivot from the portion 52 of the arm 28.

Each of the members 48 and 49 has formed thereon a sector 56 disposed angularly with respect to the arms 50 and 53. At the lower end of these sectors there is formed upon each sector a pair of lugs 57, the lugs of the two sectors facing each other and forming sockets as shown in Fig. 7.

The members 48 and 49 are adapted to be actuated by a lever arm 60 formed on the control lever 61 and extending downwardly between the two sectors 56. The control lever 61 is pivoted for lateral movement of a pivot 62 and is furthermore journaled for movement in a vertical plane on a bushing 63 surrounding the hubs of the members 48 and 49. As the control lever 61 is moved laterally it will engage one or the other of the sectors and will be positioned between the lugs 57 formed thereon. The vertical movement of the lever will then effect also a rotation of the member 48 or 49 thereby moving the control arm 28 in the desired direction. As one of the members 48 or 49 is moved with its sector, the sector 56 on the other member will retain the lever arm 60 in engagement with the socket formed by the lugs 57 on the member being actuated.

A spring 64 is secured to a lug 65 formed on the control lever casting and to a bracket 66 secured to the frame, the latter spring connection being offset from the former to normally retain the control lever in engagement with the forward speed control sector. An adjustable abutment stop 67 is carried by the bracket 35 and limits the return movement of the control lever. The stop 67 may be adjusted in such a position that the lower end of the arm 60 will be positioned between the two sets of lugs 57 when the lever is retracted.

Means has been provided for retaining the control lever in its high speed position of adjustment in order that when the operator has brought the vehicle up to maximum speed it may not be necessary for him to maintain the pressure on the control lever. This means comprises a latch 68 pivoted at 69 to a portion of the bracket 35 and actuated by a spring 70, one end of which extends under the arm and the opposite end of which is fixed against movement as shown at 71. A lug 72 is formed on the free end of the latch 68 and is adapted to engage the control lever 61 when the lever has been adjusted to its high speed position. In order to prevent the application of the brakes until the power has been disconnected from the drive wheels the hand brake lever has a lug 73 formed on or secured to the arm 41 and adapted to engage a lug 74 formed on the latch 68 when the hand brake lever is moved in a direction to apply the brakes. In order to accomplish the same end the foot brake control lever 44 has formed thereon a lug 75 adapted to engage a lug 76 also formed on the latch 68 when the foot pedal 44 is moved in a direction to apply the brakes.

The operation of the control mechanism and the brake mechanism will now be outlined. When the operator desires to apply the power and propel the vehicle in a forward direction the control pedal 61 is rocked on its pivot 62 into a position between the lugs 57 on the sector 56 of the control member 48 unless the lever is already in engagement with this member, due to the action of the spring 64. The control pedal 61 will then be rotated on its journal 63 in a direction to swing the sector about its pivot and by means of the arm 50 and link 51 to rotate the controller arm 28 into the position shown in Fig. 9, the position indicated being that corresponding to the sigh speed forward drive. When the control pedal 61 has been moved to this position the latch 68 will automatically snap in and retain the pedal in this position until it is released. If, after operating the control pedal to propel the vehicle in a forward direction at high speed, the operator desires to apply the brakes, the actuation of either the foot brake pedal 44 or hand brake lever 40 will automatically retract the latch 68 and release the control pedal 61. The spring 64 will then retract the pedal and return it to its normal position. The operation of the control lever 61 to reverse the direction of movement of the vehicle is exactly the same as that just described except for the fact that the control pedal 61 will be initially moved in the opposite direction about the pivot 62 to engage the sector 56 on the member 49. It should be particularly noted that the control arm 28 of the electric controller is actuated in opposite directions by the actuation of the lever or pedal 61 in one direction. The direction of movement of the arm 28 is therefore controlled by the selection of the proper sector or arm 48 or 49.

From the above description it will be seen that the control mechanism is very simple and compact and that it will effectively perform the desired functions. Furthermore, by interconnecting the brake control and drive control it has been made impossible to apply the brakes while the power is connected to the drive wheel.

Although I have in the above specification described one specific embodiment of my invention, it will be understood that the invention is capable of modification and that changes in the construction and in the arrangement of the various cooperating parts may be made without departing from the spirit or scope of the invention as expressed in the following claims.

What I claim is:

1. In a motor vehicle, control mechanism comprising a pair of pivoted arms, a control lever, selectively engageable with either of said arms, a drive motor, a controller therefor and connections between said arms and said controller.

2. In a motor vehicle, control mechanism comprising a pair of pivoted arms, a pivoted and laterally movable control lever selectively engageable with either of said arms, a drive motor, a controller therefor and connections between said arms and said controller.

3. In a motor vehicle, control mechanism comprising a pair of pivoted arms, a control lever selectively engageable with either of said arms, a drive motor, a controller therefor, an arm connected to operate the controller and connections between the pivoted arms and opposite ends of the controller arm.

4. In a motor vehicle, a control mechanism comprising a pair of pivoted arms, a control lever pivoted for movement in planes at right angles to each other, selectively engageable with either of said arms, a drive motor, a controller therefor and connections between said arms and said controller.

5. In a motor vehicle, control mechanism comprising a pair of pivoted arms, a control lever selectively engageable with either of said arms, a drive motor, a controller therefor, connections between said arms and said controller and means automatically engageable with said control lever to retain the lever in position at the limit of its actuating movement.

6. In a motor vehicle, control mechanism comprising a pair of pivoted arms, a control lever selectively engageable with either of said arms, a drive motor, a controller therefor, connections between said arms and said controller, means for retaining said control lever in its maximum speed position of adjustment, brake mechanism, actuating means therefor, and means whereby the movement of the brake actuating means will automatically release the control lever retaining means.

7. In a motor vehicle, an electric motor, a controller therefor, a pivoted arm for actuating the controller, a pair of pivoted arms, one of said arms being connected to said first named arm at each side of the pivot thereof, and a control lever engageable with either of said pair of arms.

8. In a motor vehicle, an electric motor, a controller therefor, a pivoted arm for actuating the controller, a pair of pivoted arms, one of said arms being connected to said first named arm at each side of the pivot thereof, and a control lever movable about vertical and horizontal pivots and engageable with either of said pair of arms.

9. In a motor vehicle, a change speed and forward and reverse drive control lever, means for automatically retaining said lever in high speed position, means for returning said lever to neutral position, brake mechanism, an actuating lever therefor and means carried by said actuating lever for releasing the control lever retaining means upon the movement of the actuating lever in a direction to apply the brakes.

10. In a motor vehicle, a change speed and forward and reverse drive control lever, means for automatically retaining said lever in high speed position, means for returning said lever to neutral position, brake mechanism, foot and hand operable actuating levers therefor and means carried by said actuating levers for releasing the control lever retaining means upon the movement of the actuating levers in a direction to apply the brakes.

11. In a motor vehicle, a motor operatively connected to propel the vehicle, and control mechanism for said motor comprising a pair of members, arranged side by side and having normally aligned inwardly facing segments each of said segments having at one end thereof a socket adapted to receive a control lever, a control lever mounted for vertical and lateral movement and having a portion adapted to enter the sockets on said segments, and means including operative connections to said pair of members for controlling the motor.

12. In a motor vehicle, a motor operatively connected to propel the vehicle, and control mechanism for said motor comprising a pair of members arranged side by side and having normally aligned inwardly facing segments each of said segments having at one end thereof a socket adapted to receive a control lever, a control lever mounted for vertical and lateral movement and having a portion adapted to enter the sockets on said segments, a controller for the motor, a pivoted arm for operating the controller and a connection from one of said pair of members and said pivoted arm at one side of the pivot thereof and between the other of said members and the arm at the other side of the pivot thereof.

13. In a motor vehicle, a frame, a bracket, a shaft carried thereby, a motor for driving the vehicle, and selective control means carried by said shaft and operatively connected to control the forward and reverse speeds of the motor.

14. In an electrically operated motor vehicle, a controller, a vehicle control lever and operative, selective connections between the lever and controller whereby actuating of the lever in one direction will operate the controller in either of two directions.

15. In an electrically operated motor vehicle, a controller, a rotatable control member thereon, a vehicle control lever and operative, selective connections between the lever and controller whereby actuation of the lever in one direction will rotate the control member in either direction.

16. In an electrically operated motor vehicle, a controller having a rotatable control member, a vehicle selective control lever, and operative connections between the lever and control member whereby actuation of the lever in one direction will rotate the control member in either direction.

17. In an electrically operated motor vehicle, a controller having a rotatable control member, a vehicle selective control lever, and operative connections between the lever and control member including pivoted arms selectively engageable by the vehicle control lever whereby actuation of the lever in one direction will rotate the control member in either direction.

18. In an electrically operated motor vehicle, a controller having a rotatable control member, a vehicle selective control lever, operative connections between the lever and control member whereby actuation of the lever in one direction will rotate the control member in either direction, and means for returning the vehicle control lever to normal position.

19. In an electrically operated motor vehicle, a controller having a rotatable control member, a vehicle selective control lever, and operative connections between the lever and control member including pivoted forward and reverse speed control arms selectively engageable by the vehicle control lever whereby actuation of the lever in one direction will rotate the control member in either direction, and means for returning the vehicle control lever to normal position in engagement with the forward speed control arm after the actuation thereof.

20. In an electrically operated motor vehicle, a controller having a rotatable control member, a vehicle selective control lever, operative connections between the lever and control member including pivoted forward and reverse speed control arms selectively engageable by the vehicle control lever whereby actuation of the lever in one direction will rotate the control member in either direction, and single means for returning the vehicle control lever to normal position in engagement with the forward speed control arm after the actuation thereof.

21. In combination, a motor, a controller therefor, a selective control lever and operative connections between the lever and the controller whereby actuation of the lever in one direction will rotate the controller in either direction.

22. In combination, a rotatable control member, a control lever and selective operative connections between the lever and said member whereby actuation of the lever will rotate the control member in either direction.

23. In combination, a motor, a rotatable controller therefor, a control lever and selective operative connections between said lever and said motor whereby actuation of the lever will rotate the control member in either direction.

24. In combination, a controller, a selective control lever and selective operative connections between the lever and controller whereby actuation of the control lever in one direction will operate the controller in either of two directions.

In witness whereof, I have hereunto set my hand this 26th day of January, 1922.

JOSEPH A. ANGLADA.